Aug. 15, 1950      D. C. GREEN      2,518,540
PRESSURE GAUGE

Filed Sept. 21, 1945      3 Sheets-Sheet 1

INVENTOR.
Donald C. Green
BY Harry P. Canfield
ATTORNEY

Aug. 15, 1950   D. C. GREEN   2,518,540
PRESSURE GAUGE

Filed Sept. 21, 1945   3 Sheets-Sheet 2

INVENTOR.
Donald C. Green
BY Harry P. Canfield
ATTORNEY

Aug. 15, 1950  D. C. GREEN  2,518,540
PRESSURE GAUGE
Filed Sept. 21, 1945  3 Sheets-Sheet 3

INVENTOR.
Donald C. Green
BY Harry P. Canfield
ATTORNEY

Patented Aug. 15, 1950

2,518,540

UNITED STATES PATENT OFFICE 2,518,540

PRESSURE GAUGE

Donald C. Green, Russell, Ohio

Application September 21, 1945, Serial No. 617,727

7 Claims. (Cl. 73—419)

This invention relates to instruments for indicating fluid pressure.

The invention is particularly applicable to embodiment in a pressure gage for indicating variable liquid pressures of high value and will be described herein as applied to that use.

The pressure gage to be described herein comprises in general a cylinder and piston; the piston being moved in the cylinder by liquid pressure and against the force of a spring; and the different position it takes up, as indicated on a scale calibrated in pressure, indicating the pressure of the liquid.

Those skilled in this art will recognize this general principle as old and well known; and, in some forms, commercialized; but there are constructional features about prior pressure gages of this class, and defects in their modes of operation, because of which they are not entirely satisfactory, particularly since the development of correlated arts and apparatus with which they are associated has advanced beyond them.

Among these objectional features are: that the tendency for high pressure liquid to leak around the piston has not been overcome without the concurrent disadvantage of great friction by pressure packing between the piston and cylinder; and this introduces inaccuracies and variableness in the pressure indications.

This leakage has heretofore been considered unavoidable and is such a common characteristic of prior high-pressure gages, that an outlet from the structure for the leaking liquid and a pipe to carry it off is a common structural feature.

In high-pressure, liquid gages of this class, rapid changes or fluctuations of the pressure cause violent vibratory movements of the scale finger or indicator; and accurate readings of the pressure on the gage scale are not possible, in such circumstances; and the prior means to damp the movement of the scale finger have not been satisfactory.

Still another defect of prior gages of this class results from the fact that the spring, opposing the pressure-effected piston movement, must be a powerful spring usually of the compressible helical type because of the high pressures encountered, and the spring while being compressed must be guided by some means that will not introduce sidewise bending of the spring and lateral thrust; otherwise binding and excessive friction will render the piston movement irregular and the gage reading inaccurate; and this defect has not been satisfactorily overcome in prior structures.

With these and other defects of prior gages in mind, the present invention has been made; and it is the primary object of the invention to overcome these defects.

Another object is to provide in a gage of the class referred to, an improved means for damping out tendencies of the piston to move with vibratory movement when subject to pulsations of liquid pressure.

Another object is to provide a liquid pressure gage of the class referred to having an improved construction of piston, and seal for the same, while reciprocating in the cylinder, in one direction by the applied liquid pressure to be measured and in the other direction by a piston movement opposing spring.

Another object is to provide improved means, in a gage of the class referred to, for transmitting movement of the piston to the opposing spring; and to the pressure indicating finger.

Another object is to provide a seal for a fluid operated reciprocating piston, constructed to constrictingly grip the piston and seal it with a constricting sealing force proportional to the fluid pressure.

Other objects and advantages of the invention will become apparent to those skilled in the art from a reading of the following description of the invention taken in connection with the accompanying drawing in which.

Figure 1:
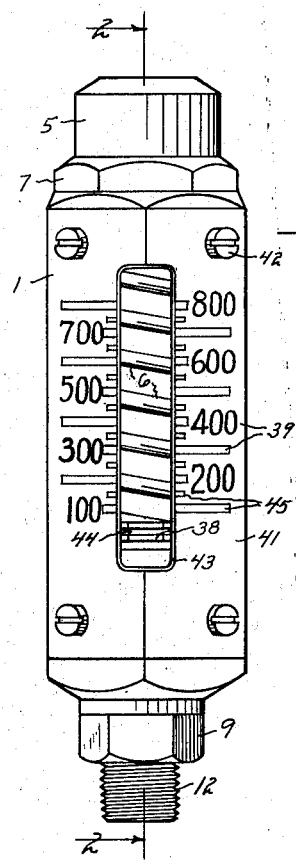
Fig. 1 is a front elevational view of a liquid pressure indicating gage embodying my invention the view being approximately full scale.
Figure 2:
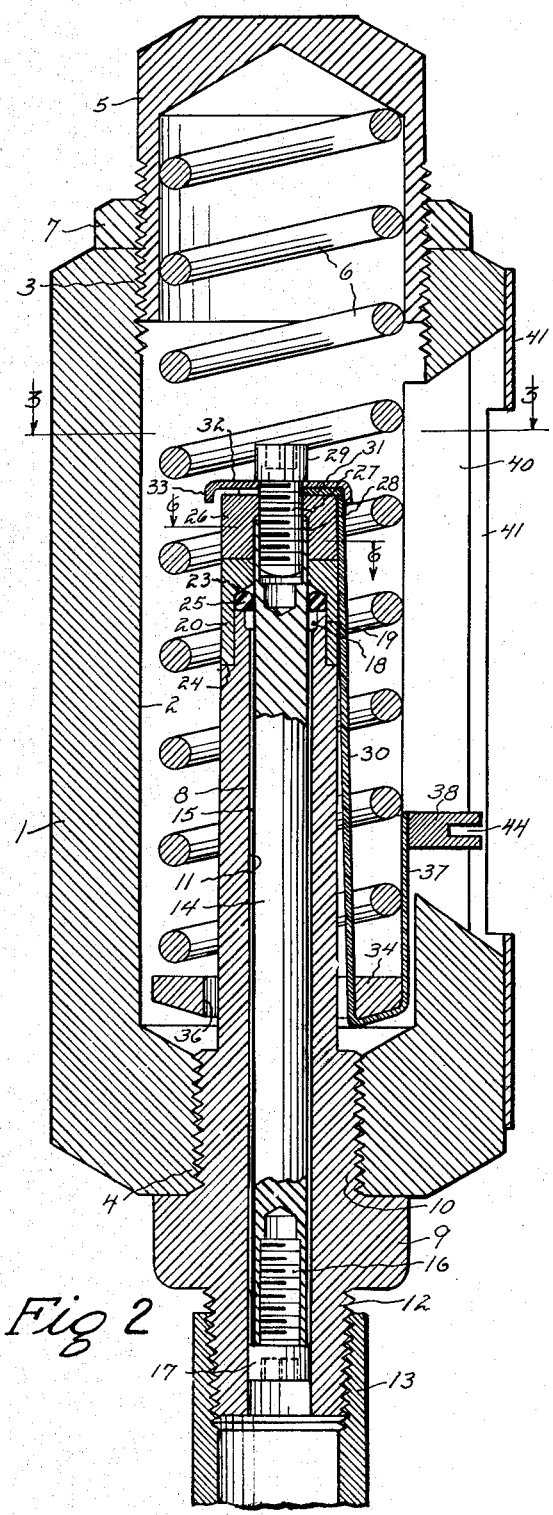
Fig. 2 is a longitudinal sectional view to enlarged scale of the embodiment of Fig. 1 and the view may be considered as taken from the plane 2—2 of Fig. 1; and is also referred to the plane 2—2 of Fig. 3.

Referring to the drawing, and to that embodiment of my invention illustrated in Figs. 1 to 8 inclusive, I have illustrated at 1 a main housing, preferably formed from a bar of metal of hexagonal cross-section. A bore 2 Fig. 2, is provided longitudinally of the housing, and of cylindrical form, the outer end of the bore being internally threaded as at 3; the lower end of the bore as viewed in Fig. 2 being of reduced diameter and threaded as at 4.

Into the upper end of the bore is screw threaded a cup form closure 5, to function also as an abutment for a spring 6 in the bore to be referred to; and the closure 5 may be screw threaded in or out of the bore adjustably to adjust the tension of the spring; and at any adjusted position may be fixed or locked by a nut 7 on the threads of the closure and drawn tight against the upper end of the housing 1.

A tubular cylinder 8 is provided in the bore 2, coaxially thereof, and it is preferably formed by turning down a hexagonal bar, the normal size of which is indicated at 9 where a part of the bar is left unturned and as a head 9. Immediately above the head 9 is a threaded portion 10, and inwardly of that is the tubular cylinder 8. The threaded portion 10 is screwed into the threads 4 to tightly engage the head 9 with the lower end of the housing 1 to rigidly mount the cylinder 8 in the bore.

The tubular cylinder 8 has a co-axial cylindrical cylinder bore 11 therein, open at both ends of the tubular cylinder 8.

Below the head 9, is an integral extension 12, having pipe threads thereon, on which a conduit or pipe 13 may be screwed, in which pipe is the liquid whose pressure is to be indicated; and by the construction described, this pressure is communicated to the lower end of the cylinder bore 11.

A piston 14 is disposed in the cylinder bore 11, reciprocable therein, with ample clearance as indicated at 15. The piston 14 is preferably made from a round rod. At its lower end, the piston has a threaded bore extending axially thereinto, and a screw 16 is screwed into the bore. The screw 16 has at its outer end, a cylindrical head 17 drawn tight against the lower end of the piston 14, and fitting the cylinder bore 11 with a close but freely sliding fit, whereby liquid pressure, in the cylinder bore below the head 17, will be communicated to the piston 14 notwithstanding that throughout the greater part of the length of the piston it has a clearance fit as at 15 with the cylinder bore. The head 17 also performs a damping or dash pot action which will be described later.

At the upper end of the tubular cylinder 8 the cylinder bore 11 is enlarged to provide a recess or clearance space 18, and the outside diameter of the tubular cylinder 8 is turned down as at 19; thereby providing an annular end to the tubular cylinder of relatively thin radial section. A sleeve 20, the outer diameter of which is approximately that of the tubular cylinder 8, has its inner wall telescoped over the reduced diameter portion 19 of the cylinder substantially fitting the same; and at its upper part, the inner wall of the sleeve 20 has a free clearance fit around the piston 14; and at its intermediate part the inner wall of the sleeve 20 is conical as at 23, and spaced axially from the end of the cylinder 8, whereby a continuation of the clearance space 18 is provided. As will be apparent in Fig. 2 this construction provides a shoulder 24 on the tubular cylinder 8 against which the lower end of the sleeve 20 abuts to position it.

In the annular pocket-like clearance space thus provided, a circular ring 25 of rubber or like compressible material, circular in radial cross section, is placed, and trapped between the conical surface 23, and the annular end of the cylinder 8. The ring 25 is of such internal diameter that it grips the rod-like piston 14 therewithin; and the radial section of the ring is of such size, that it at all times engages the walls of the pocket in which it is trapped, and is at all times under at least some degree of compression, so that its radial section is at all times at least somewhat distorted out of circular form.

This ring as described, therefore, provides a liquid seal between the rod-like piston 14 and the cylinder bore 11, whereby liquid, which may seep past the head 17 at the lower end of the piston, is trapped in the clearance space 15 and cannot pass upwardly beyond the ring 25 during reciprocations of the piston 14 to be described.

The sleeve 20 is permanently secured to the upper end of the tubular cylinder 8, preferably by press fitting it over the end of the cylinder as described; but if preferred it may be secured thereon by brazing or the like.

A head 26 is secured upon the upper end of the piston. This head is preferably hexagonal in external contour, and therefore is preferably made from a bar of hexagonal stock, for a purpose to be described. A screw 27 is threaded into the upper end of the piston; and the end of the piston is seated in a bore or recess 28 in the head 26; and when the screw 27 is screwed in and pulled up tight, the head 29 of the screw secures the head 26 on the end of the piston, and the head 26 therefore travels longitudinally with movement of the piston, see Fig. 5.

Figure 5:
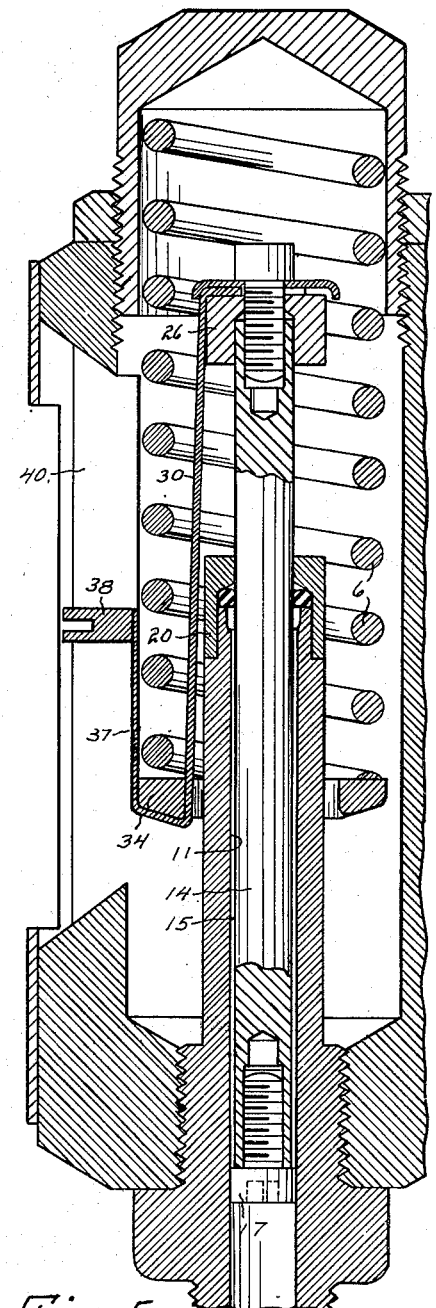
Fig. 5 is a view similar to Fig. 2 with operative parts thereof in different positions, the view being taken from the plane 5—5 of Fig. 3.
Figure 11:
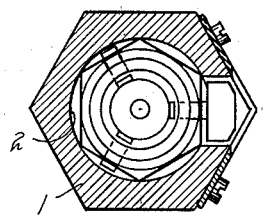
Fig. 11 is a sectional view taken from the plane 11—11 of Fig. 9.

The head 26 has associated therewith, or connected thereto, a plurality such as three, hangers 30 depending from the head and lying along the outside of the tubular cylinder 8, but as shown in Figs. 2 and 5, not in contact therewith.

These hangers are preferably made from strips of metal. To secure them to the head 26, their upper ends are bent as at 31 inwardly so as to lie on top of the head 26; a cover cap 32 having a depending peripheral edge 33, is laid on top of the bent ends 31, with the peripheral edge circumscribing the upper ends of the hangers; and the screw 27 is projected through a central perforation in the cap 32. When the screw is drawn down tight as described, the head 29 of the screw engages the upper side of the cap 32, and the bent ends 31 of the hangers are clamped between the cap 32 and the head 26, and trapped within the depending edge 33, and thereby rigidly secured at their upper ends to the head 26.

Figure 6:
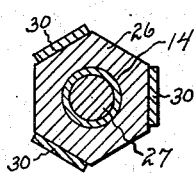
Fig. 6 is a fragmentary sectional view taken from the plane 6—6 of Fig. 2.
Figures 7, 8:
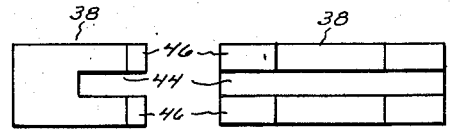
Fig. 7 is a front elevational view taken in the direction of the arrow 7 of Fig. 3 illustrating a scale indicating-pointer which I prefer to employ.
Fig. 8 is an elevational view taken from the left hand side of Fig. 7.

As shown in Fig. 6, the sheet metal hangers 30 at their upper portions lie against the flat faces of the hexagonal head 26 so that when their upper ends are trapped by the cap as described, they are prevented from shifting circumferentially around the axis of the device, which conveniently distributes them approximately 120 degrees apart from each other around the axis.

Figure 3:
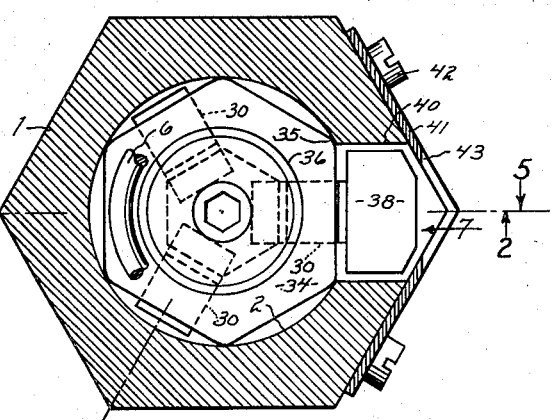
Fig. 3 is a cross sectional view taken from the plane 3—3 of Fig. 2.
Figure 4:
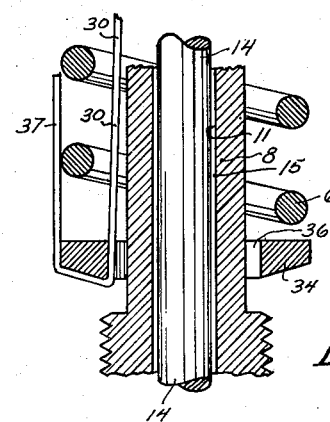
Fig. 4 is a fragmentary view similar to a part of Fig. 2 but taken from the plane 4 of Fig. 3.

At the lower ends of the hangers is a spring abutment or seat 34, carried by the hangers and movable therewith, when the head 26 is moved by the piston. The spring seat 34 is preferably made in the form of a washer, from a piece of hexagonal bar stock, the diagonal dimension of which corresponds to the diameter of the bore 2; and as shown in Fig. 3 the six corners thereof are rounded off as at 35, whereby the seat 34 may slide axially in the bore 2 and be guided thereby. The seat 34 has a central perforation 36 by which it is telescoped over the tubular cylinder 8; and the perforation 36 is large enough to provide an annular clearance space around the cylinder. The hangers 30 at their lower end portions project downwardly through the perforations 36, see Figs. 2 and 4 and bent outwardly under the seat 34 and then upwardly approximately parallel with the axis of the bore in riser portions 37. By this means the seat 34 is carried by the hangers, and inasmuch as the seat itself is guided by the bore 2, the hangers are maintained out of contact with the cylinder 8.

The abovementioned spring 6 extends downwardly through the bore 2 and at its lower end rests upon the spring seat 34.

In the operation of the parts thus far described it will be apparent that fluid pressure in the conduit 13 communicated to the lower end of the piston 14 will raise it and the head 26, the parts when in one position after this movement being showing in Fig. 5. The hangers 30 carry the spring seat 34 upwardly with them and with the piston, against the tension of the spring 6, the lower end of which is raised thereby. The lower end of the spring 6 is trapped between the radially inner portions of the hangers 30 and the radially outer portions or risers 37 thereof, and thereby maintained on the seat 34 and out of contact with the bore wall or with the tubular cylinder 8; and the seat 34 is guided by the bore 2, so that the spring and the hangers are kept out of binding engagement with adjacent parts as the piston moves. The riser portions 37 of one of the hangers, as shown in Fig. 2, has connected thereto a scale pointer 38, cooperating with a scale 39, see Fig. 1 on the outside of the housing 1, calibrated in liquid pressure.

To this end, a longitudinal slot 40 is provided in the side wall of the housing 1, in which the pointer 38 reciprocates. A sheet metal plate 41, see Figs. 3 and 1, is secured on the slotted side of the housing by screws 42, and has a slot 43 therein, communicating with the slot 40, and has the aforesaid scale 39 thereon. In its preferred form the pointer 38 is a block of material such as metal, see Figs. 3, 7, and 8, substantially filling, transversely, the housing slot 40; and in its forward face has a deep transverse groove 44, aligned transversely with the indication marks or lines of the scale 39.

The scale 39, see Fig. 1, besides having numbers indicating pressure, has wide lines 45 thereon, and these are preferably colored or painted with a bright colored paint, luminous paint, or the like, to render them readily visible at some distance. The slot 44 in the pointer is preferably of approximately the same width as these lines; and the edge portions of the block as at 46—46 above and below the slot 44, are likewise painted with a bright colored paint, luminous paint, or the like, and between which is the slot 44 of the pointer, which, being unpainted and in shadow, appears dark to the eye.

With this construction, it will readily be apparent, from Fig. 1 for example, that as the pointer 38 moves upwardly, the eye of the observer can readily read the alignment of the dark slot 44 with one of the light colored or bright scale lines 45 and read the indicated pressure at a distance.

When the parts are in the condition of Fig. 5, and the lower end of the piston is therefore subjected to pressure, there are instances in use in which the pressure fluctuates violently. In the absence of other provisions, this would cause the piston 14 to vibrate longitudinally, and accordingly vibrate the scale pointer 38 and make it difficult to read the pressure on the scale 39. In the construction illustrated and above described, whenever there is a sudden change in pressure under the lower end of the piston, tending to move it upwardly or downwardly, the head 17 on the lower end of the piston which substantially fits the cylinder bore 11, acts as a dash-pot to damp out such vibratory movements of the piston and stabilize its movement. If the piston tends to move upwardly with sudden movement, liquid in the clearance space 15, is subjected to a momentary excess of pressure and seeps downwardly around the head 17; and when the piston tends to move downwardly suddenly, due to a drop of the main pressure, an excessively low pressure is created in the clearance space 15 and the liquid must seep upwardly around the head 17. This as will be apparent causes the head 17 to act as a dash-pot, and retard or damp out quick movements of the piston.

Although the piston has a close fit with the cylinder bore 11 at its lower end, for the damping purposes described, the clearance space 15 around the piston will be subjected to the main pressure; and this pressure will be communicated to the lower side of the sealing ring 25, tending to further distort the ring and amplify the sealing action of the ring above described. The greater the liquid pressure, the more will the ring be distorted and the more tightly will the ring seal the cylinder and the piston, but at the same time, the greater the liquid pressure, the more force there is to move the piston; and vice versa. It follows that the sealing effect of the ring varies directly with the pressure which it seals, so that at all pressures there is the minimum of effective friction drag or load of the ring on the moving piston within it. It will be observed that because of the pocket 18 under the ring, the liquid pressure is communicated to the ring over a large area on its underside for the pressure-effected distortion purposes just mentioned.

In the form of my invention shown in Figs. 9 to 12 inclusive, some of the parts will be seen to be like those of the first described form as indicated by the use of the same reference characters therefor, and others of the parts need not be described. The differences are as follows.

There is again a tubular cylinder 47 rigidly supported coaxially in the bore 2 of the housing 1 by screw threads 4 on its lower end and a head 9. A piston 48 of rod-like form reciprocates in the cylinder bore 49 with clearance as at 15.

In this form, a sealing ring 50 is provided adjacent the lower end of the piston. An annular groove is formed in the piston and the ring 50 of rubber or like compressible material is seated on the groove and while it is normally of circular radial cross section it is large enough in cross section and in outside diameter to be somewhat distorted to engage the cylinder bore 49 and the sides of the groove with a leakproof pressure.

Upon the upper end of the piston is secured, by press fitting, or by brazing or the like, a head 51, to the sides of which are secured by solder or by brazing, a plurality such as three depending hangers 52 of sheet metal, these hangers engaging and supporting a spring seat 34 which may be constructed and guided on the bore wall 2 as described for a like spring seat in Fig. 2.

Figure 9:
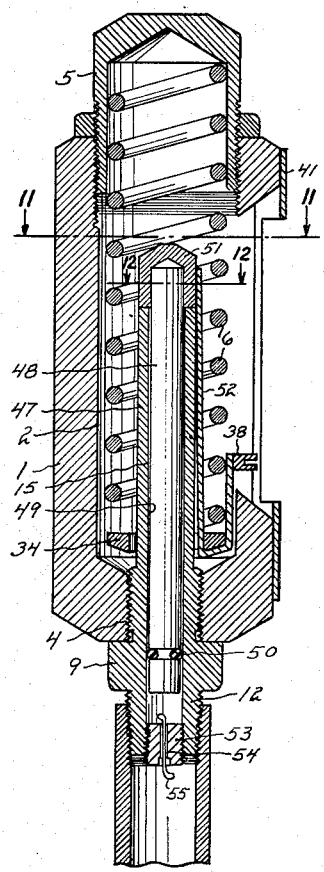
Fig. 9 is a longitudinal sectional view somewhat similar to Fig. 2 but illustrating a modification, and drawn approximately full scale.
Figure 10:
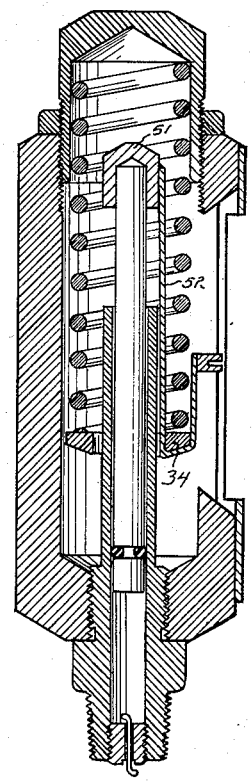
Fig. 10 is a view of the parts of Fig. 9 with certain operative parts in different positions.
Figure 12:
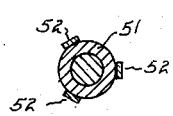
Fig. 12 is a fragmentary sectional view taken from the plane 12—12 of Fig. 9.

In the form of Fig. 9, the pipe-threaded extension 12 below the head 9 is internally threaded and a plug 53 is screw threaded thereinto and it is provided with a small drilled hole 54 extending therethrough.

The general operation of this form is the same as that of the form of Fig. 2, the principal difference being in the simplification of structure effected by a different plunger and cylinder seal and by a different means for damping out vibrations of the scale pointer 38 which may result from fluctuations of pressure in the liquid, now to be described.

The pressure is communicated to the lower end of the piston 48 through the small hole 54 and this alone effectively damps out the pressure fluctuations. The hole 54 may be a very small drilled hole but to avoid difficulties in providing a very small hole, a hole 54 of large size is drilled, and a wire 55, slightly smaller in gage size than the gage size of the hole 54 is projected into and beyond the hole and bent over at both ends to trap it therein.

My invention is not limited in all respects to the details of construction illustrated and described; but includes all changes and modifications which come within the scope of the appended claims.

I claim:

1. In a gage for indicating high liquid-pressures; a housing having a cylindrical bore therein; an elongated tubular cylinder extending into the bore and spaced from the bore wall; means for communicating liquid pressure to the outer end of the cylinder; a rod-like piston in the cylinder; a head connected to the inner end of the piston; a hanger secured at its inner end to the piston head, and extending longitudinally along the outside of the tubular cylinder and out of contact therewith; and at its outer end supporting a transverse spring seat; the spring seat having a central perforation larger than the tubular cylinder through which the cylinder extends, and having an outer periphery loosely engaging the bore wall and thereby guided for axial movement in the bore; a coil spring extending longitudinally of the bore and abutting upon the seat at one end and upon a shoulder in the housing at the other end; a pressure indicating scale on the outside of the housing, and a scale pointer movable thereover; the bore wall having a longitudinal opening therethrough; and means acting through the opening communicating piston movement to the pointer.

2. In a gage for indicating high liquid-pressures; a housing having a cylindrical bore therein; an elongated tubular cylinder extending into the bore and spaced from the bore wall; means for communicating liquid pressure to the outer end of the cylinder; a rod-like piston in the cylinder; an annular sealing ring of rubber or like compressible material mounted on the cylinder walls and circumscribing the piston and sealing it with respect to the cylinder wall; a head connected to the inner end of the piston; a hanger secured at its inner end to the piston head, and extending longitudinally along the outside of the tubular cylinder and out of contact therewith; and at its outer end supporting a transverse spring seat; the spring seat having a central perforation larger than the tubular cylinder through which the cylinder extends, and having an outer periphery loosely engaging the bore wall and thereby guided for axial movement in the bore; a coil spring extending longitudinally of the bore and abutting upon the seat at one end and upon a shoulder in the housing at the other end; the bore wall having a longitudinal opening therethrough; a pressure indicating scale on the outside of the housing, and a scale pointer movable thereover and connected through the opening to the hanger.

3. In a gage for indicating high liquid-pressures; a housing having a cylindrical bore therein; an elongated tubular cylinder extending into the bore and spaced from the bore wall; means for communicating liquid pressure to the outer end of the cylinder; a rod-like piston movable in the cylinder; a head connected to the inner end of the piston; a sheet metal hanger extending longitudinally along the outside of the tubular cylinder and out of contact therewith, and at its inner end, secured to the piston head and being movable with the piston; a transverse spring seat having a central perforation larger than the tubular cylinder through which the cylinder extends, and having a peripheral portion engaging the bore wall and thereby guided for axial movement in the bore; the inner end of the hanger passing through the seat perforation and under the seat and supporting it; a coil spring extending longitudinally of the bore and abutting at one end on the seat and at the other on a shoulder in the housing; the bore wall having a longitudinal opening therethrough; a pressure indicating scale on the outside of the housing; a pointer movable over the scale; means communicating movement of the hanger through the opening to the pointer.

4. In a gage for indicating high liquid-pressures; a housing having a cylindrical bore therein; an elongated tubular cylinder extending into the bore and spaced from the bore wall; means for communicating liquid pressure to the outer end of the cylinder; a rod-like piston in the cylinder; a head connected to the inner end of the piston; a hanger secured at its inner end to the piston head, and movable therewith, and extending longitudinally along the outside of the tubular cylinder and out of contact therewith; and at its outer end supporting a transverse spring seat; the spring seat having a central perforation larger than the tubular cylinder through which the cylinder extends, and having an outer periphery loosely engaging the bore wall and thereby guided for axial movement in the bore; a coil spring extending longitudinally of the bore and abutting upon the seat at one end and upon a shoulder in the housing at the other end; the bore wall having a longitudinal opening therethrough; a pressure indicating scale on the outside of the housing, and a scale pointer movable thereover and means acting through the opening and communicating piston movement to the pointer; the pointer comprising a body having an edge portion between spaced apart faces and having a slot in the edge portion between the faces.

5. In a gage for indicating high liquid-pressures; a housing having a cylindrical bore therein; an elongated tubular cylinder extending into the bore and spaced from the bore wall; means for communicating liquid pressure to the outer end of the cylinder; a rod-like piston in the cylinder; the cylinder wall having an annular recess therein; a ring of rubber or like compressible material in the recess and constrictingly gripping the piston; and the ring sealing the piston with respect to the cylinder wall; a head connected to the inner end of the piston; a hanger secured at its inner end to the piston head, and movable therewith, and extending longitudinally along the outside of the tubular cylinder and out of contact therewith; and at its outer end supporting a transverse spring seat; the spring seat having a central perforation larger than the tubular cylinder through which the cylinder extends, and having an outer periphery loosely engaging the bore wall and thereby guided for axial movement in the bore; a coil spring extending longitudinally of the bore and abutting upon the seat at one end and upon a shoulder in the housing at the other end; the bore wall having a longitudinal opening therethrough; a pressure indicating scale on the outside of the housing, and a scale pointer movable thereover and means acting through the opening communicating piston movement to the pointer.

6. In a gage for indicating high liquid-pressures; a housing having a cylindrical bore therein; an elongated tubular cylinder extending into the bore and spaced from the bore wall; means for communicating liquid pressure to the outer end of the cylinder; a rod-like piston in the cylinder; the cylinder wall having an annular recess therein, circumscribing the piston; a ring of rubber or like compressible material in the recess and engaging the cylinder wall and sealing the piston with respect to the cylinder wall; a head connected to the inner end of the piston; a hanger secured at its inner end to the piston head, and extending longitudinally along the outside of the tubular cylinder and out of contact therewith; and at its outer end supporting a transverse spring seat; the spring seat having a central perforation larger than the tubular cylinder through which the cylinder extends, and having an outer periphery loosely engaging the bore wall and thereby guided for axial movement in the bore; a coil spring extending longitudinally of the bore and abutting upon the seat at one end and upon a shoulder in the housing at the other end; the bore wall having a longitudinal opening therethrough; a pressure indicating scale on the outside of the housing, and a scale pointer movable thereover and means acting through the opening communicating piston movement to the pointer.

7. In a gage for indicating high liquid-pressures; a housing having a cylindrical bore therein; an elongated tubular cylinder extending into the bore and spaced from the bore wall; means for communicating liquid pressure to the outer end of the cylinder; a rod-like piston in the cylinder; an annular sealing ring of rubber or like compressible material mounted on the cylinder walls and circumscribing the piston and sealing it with respect to the cylinder wall; a head connected to the inner end of the piston; a hanger secured at its inner end to the piston head, and extending longitudinally along the outside of the tubular cylinder and out of contact therewith; and at its outer end supporting a transverse spring seat; the spring seat having a central perforation larger than the tubular cylinder through which the cylinder extends, and having an outer periphery loosely engaging the bore wall and thereby guided for axial movement in the bore; a coil spring extending longitudinally of the bore and abutting upon the seat at one end and upon a shoulder in the housing at the other end; the bore wall having a longitudinal opening therethrough; a pressure indicating scale on the outside of the housing, and a scale pointer movable thereover and means acting through the opening communicating piston movement to the pointer; the main body of the rod-like piston fitting loosely in the cylinder, and at its outer end and within the cylinder provided with an enlarged-diameter substantially cylindrical portion.

DONALD C. GREEN.

REFERENCES CITED

The following references are of record in the file of this patent:

UNITED STATES PATENTS

| Number | Name | Date |
| --- | --- | --- |
| 1,279,078 | Bowden | Sept. 17, 1918 |
| 1,523,290 | Rimailho | Jan. 13, 1925 |
| 2,110,386 | Williams | Mar. 8, 1938 |

FOREIGN PATENTS

| Number | Country | Date |
| --- | --- | --- |
| 645,809 | France | July 3, 1928 |